United States Patent [19]
Tague

[11] Patent Number: 5,946,392
[45] Date of Patent: Aug. 31, 1999

[54] TELEPHONE HANDSET INTERFACE DEVICE

[75] Inventor: Barry L. Tague, Carmel, Ind.

[73] Assignee: Lucent Technologies Inc., Murray Hill, N.J.

[21] Appl. No.: 08/755,507

[22] Filed: Nov. 22, 1996

[51] Int. Cl.⁶ .................................................. H04M 1/00
[52] U.S. Cl. .......................... 379/395; 379/27; 379/146; 379/387; 381/111
[58] Field of Search ...................... 379/399, 398, 379/387, 395, 441, 413, 90.01, 27, 146, 155; 381/111, 112, 113, 114

[56] References Cited

U.S. PATENT DOCUMENTS

| | | | |
|---|---|---|---|
| 4,039,768 | 8/1977 | O'Maley | 379/154 |
| 4,672,663 | 6/1987 | Tomasi | 379/387 |
| 4,718,083 | 1/1988 | Boeckmann | 379/395 |
| 4,918,726 | 4/1990 | Snyder | 379/395 |
| 4,985,910 | 1/1991 | McGarry | 379/146 |
| 5,036,536 | 7/1991 | Hanon et al. | 379/395 |
| 5,185,789 | 2/1993 | Hanon et al. | 379/395 |
| 5,239,579 | 8/1993 | Schuh | 379/395 |
| 5,577,129 | 11/1996 | Ehara | 379/395 |
| 5,623,544 | 4/1997 | Papadopoulos | 379/395 |
| 5,687,228 | 11/1997 | Ellington, Jr. et al. | 379/395 |
| 5,729,603 | 3/1998 | Huddart et al. | 379/387 |

Primary Examiner—Forester W. Isen
Assistant Examiner—Jacques M. Saint-Surin

[57] ABSTRACT

An interface device for mating transducer-based telephone handsets to a telephone, and particularly transducer-based telephone handsets having different electrical input/output requirements comprises: a current source device for providing current flow through a transducer of the telephone handset; a device for detecting the current flow through the transducer present in the telephone handset and generating a handset type signal according to the amount of current flow detected; and, an adjusting device for adjusting the electrical characteristics of audio signals to be transmitted according to the generated handset type signal. The interface device further includes a control device responsive to the handset type signal for maintaining the current source device in an ON state to provide a predetermined amount of current flow to the telephone handset, or an OFF state substantially reducing current flow to the telephone handset.

33 Claims, 3 Drawing Sheets

TELEPHONE HANDSET INTERFACE DEVICE

FIELD OF THE INVENTION

The present invention relates generally to communication and telephone systems in general, and more specifically, to an interface device for mating transducer-based telephone handsets having different electrical input/output requirements to a telephone without operator intervention.

DESCRIPTION OF THE PRIOR ART

There are two types of handsets used with telephones today—classified by the type of microphone transducer used in the handset: the older telephone, many of which are still employed in the public telephone market, utilize carbon-based microphone transducers, and the newer telephone technology utilize an electret-based microphone transducer for improving the sound quality of the audio signals generated by the telephone. Many of the electret-based transducer handsets are being introduced into the public telephone market and replacing the older carbon-based transducer telephone handsets.

As shown in FIG. 1A, the differences between the carbon-based transducer and the newer electret based transducer handsets are as follows: the carbon-based transducer microphone 12 is a variable resistance device 15, having a low resistance 15, typically in the range of 40Ω–200Ω (ohms). A voltage is generated across the microphone transducers terminals TX+ and TX− by sending a constant current through the resistor device 15. As the resistance of resistor 15 changes, e.g., in accordance with sound pressure levels received by the transducer microphone, the voltage across terminals TX+ and TX− will change due to Ohm's Law V=IR (with I constant). As the carbon-based transducer microphone handset was designed when all that existed was passive telephone with no amplification, it has very high sensitivity and the telephone does not require much amplification.

The newer electret-based transducer microphone 17 on the other hand, is more of a voltage source as indicated in FIG. 1B by the transistor 19 and requires a much smaller current to operate than the carbon-based handset. It also has a very high frequency response at frequencies greater than 2 kHz as compared to carbon-based handset and a much lower sensitivity, requiring amplification with gain in the order of 10–20 dB needed for proper operation with the telephone.

The electrical characteristic differences between these two devices necessitates different interface requirements with a telephone and/or communication device in respect of 1) direct current (DC) biasing, 2) AC frequency response, and 3) AC signal gain, and, consequently existing telephones having such handsets are designed to work with one or the other type of handset. Thus, to replace the older carbon-based transducer handsets in existing public telephones with the newer electret-based transducer handsets, currently requires the replacement of the whole telephone device itself.

It would be highly desirable to provide an interface circuit for a telephone or like communication device capable of utilizing both a carbon-based transducer or an electret based transducer handset interchangeably, and without operator intervention.

Moreover, it would be highly desirable to provide an interface circuit for a telephone or like communication device that would determine which type of handset is on the phone and provide the correct electrical interface requirements for the handset in use.

SUMMARY OF THE INVENTION

The invention is an interface device for implementation in a telephone for mating transducer-based telephone handsets to a telephone, and particularly transducer-based telephone handsets having different electrical input/output requirements. The interface device comprises a current source means for providing current flow through a transducer of said telephone handset; a detecting means for detecting the current flow through said transducer present in the handset device and generating a handset type signal according to the amount of current flow detected; and, an adjusting means for adjusting the electrical characteristics of the audio signals transmitted according to the generated handset type signal. The interface device further includes a control means responsive to the handset type signal for maintaining the current source means in an ON state to provide a predetermined amount of current flow to the handset, or an OFF state substantially reducing current flow to the handset.

The interface device is intended for implementation in existing private or coin-operated public telephones already having carbon-based transducer handsets.

BRIEF DESCRIPTION OF THE DRAWINGS

Reference may now be had to a preferred embodiment of the telephone handset interface device of the invention, taken in conjunction with the accompanying drawings, in which.

DETAILED DESCRIPTION OF THE PREFERRED EMBODIMENTS

Figure 1A:
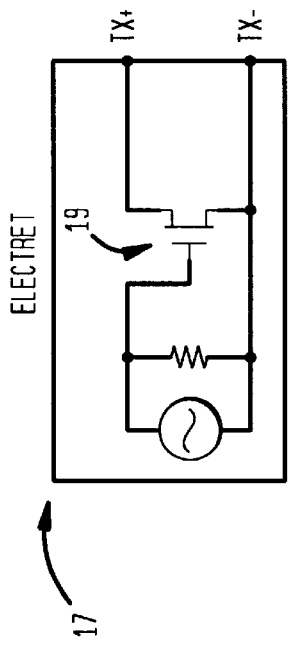
FIG. 1A is a general schematic diagram depicting the electrical equivalent of a carbon-based transducer for a telephone handset.
Figure 1B:
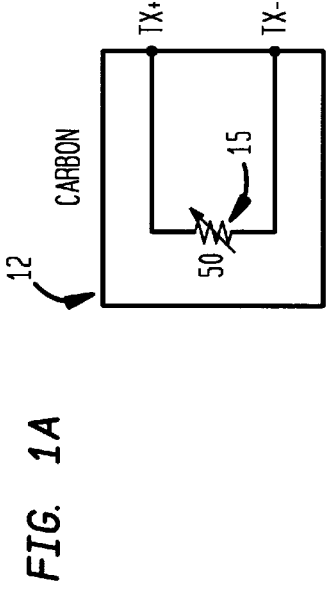
FIG. 1B is a general schematic diagram depicting the electrical equivalent of an electret-based transducer for a telephone handset.
Figure 2:
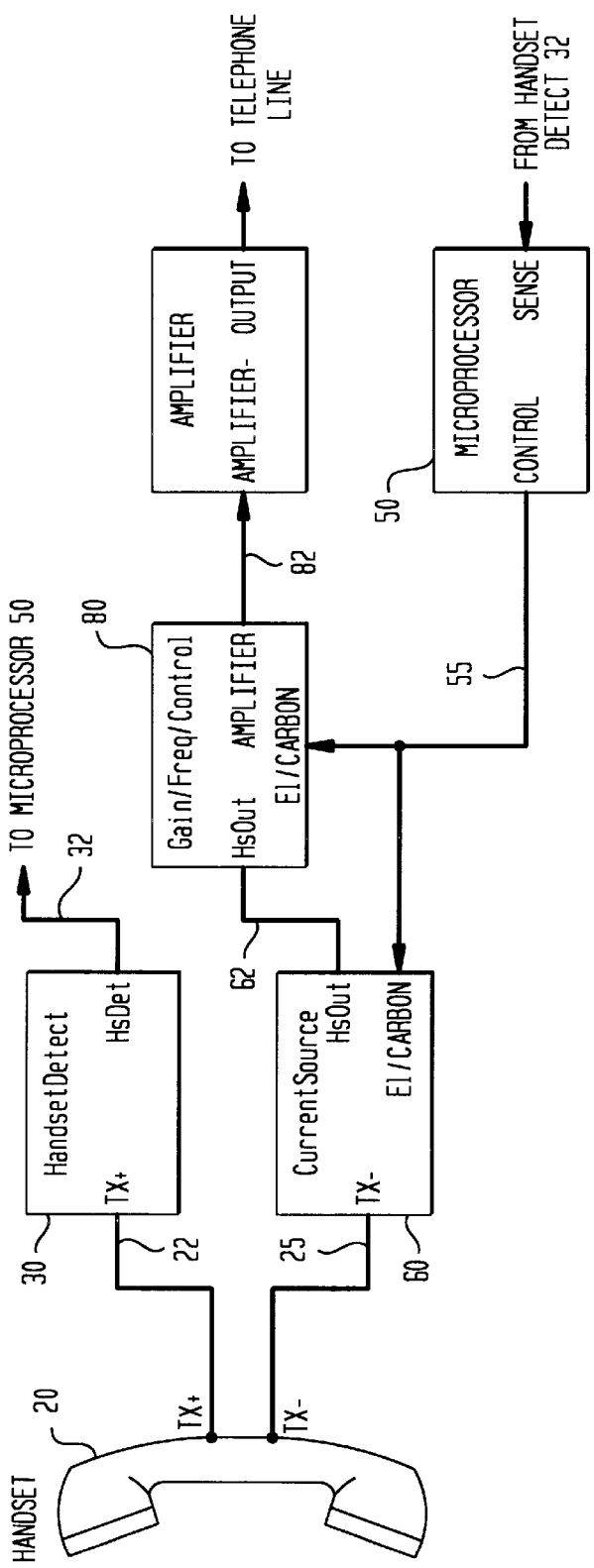
FIG. 2 is a block diagram illustrating the telephone interface device of the invention.

FIG. 2 is a general block diagram of the handset interface device of the invention. There is shown in FIG. 2, a handset 20 containing either of the carbon- or electret-based transducer microphone 12, 17 respectively, and having output transmitter terminals TX+ and TX− and respective connecting leads 22 and 25 input to a telephone or other communication device for transmitting audio signals over a telephone line or communication channel (not shown). One lead 22 from handset transmitter terminal TX+ is input to the Handset detect device 30 which functions to determine which type of handset is on the phone. The Handset detect device 30 generates a digital signal output 32 that is input to a digital control device, such as microprocessor (μP) 50. The other lead 25 from handset transmitter terminal TX− carries the audio signals from the handset to the input of a Current source device 60 which provides the constant current needed for the handset having the carbon-based transducer handset 12. A control signal 55 output from digital control device or µP 50 enables the Current source device 60 to provide, in an ON state, a constant current source depending on the type of handset detected by the Handset detect device 30. When the Current source device 60 is in an OFF state, the audio signals 25 output from terminal TX− is passed through the Current source device 60 without alteration.

Regardless of whether Current source device 60 is in an OFF or ON state, the audio signals 25 output from transmitter terminal TX− are passed through the Current source device 60 as audio signals 62 for input to Gain/Freq/Control device 80 as shown in FIG. 2. The Gain/Freq/Control device 80 determines the amount of amplification and frequency characteristic alteration that will be given to the audio signals 62 to be transmitted. For instance, electret-based transducer microphones have higher frequency response characteristics than carbon-based transducers and for proper transmission of the electret-based output audio signal, a reduction or filtering of the higher frequency components of the transmitted audio signal is often required.

As shown in FIG. 2, the same control signal 55 output from the digital control device or µP 50 switches the required gain and frequency characteristics of the transmitted microphone signal depending upon which of the two handset types is connected. The output 82 of the Gain/Freq/Control device 80 is input to an Amplifier device 90 to actually provide the gain and frequency response determined by the Gain/Freq/Control device 80.

Figure 4:
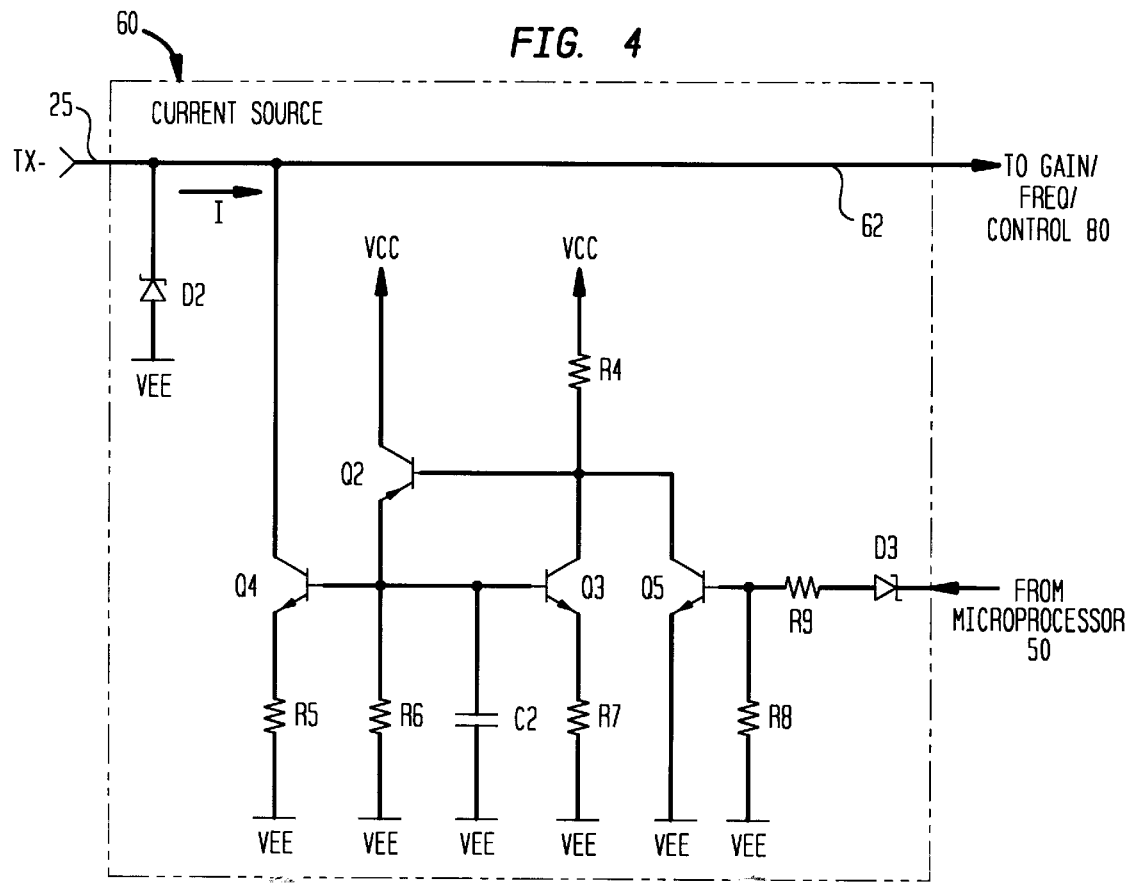
FIG. 4 is a detailed circuit diagram of the current source circuit of the telephone interface device of the invention.

In, operation, the digital control device or µP 50 determines which type of handset is on the telephone by first turning on the current source (ON state) from Current source device 60. The handset detect device 30 is able to determine if a carbon-based transducer handset is attached by virtue of its dc biasing requirements. The handset detect device 30 then signals the digital control device or µP 50 which then sets the current source device 60 and gain control device 80, accordingly. When in an ON state, the current source device 60 provides a constant current bias to the carbon-based transducer handset. Carbon-based transducer handsets usually require current in the range of 2–50 mA for proper operation. As shown in the non-limiting, circuit diagram of FIG. 4 depicting one implementation of the constant current source device 60, the amount of dc current, I, indicated by the arrow shown in FIG. 4, is set by Vcc, Vee, R4, R5, and R7. As a first approximation according to the circuit shown in FIG. 4, the current I is determined by:

$$I = \frac{((V_{cc} - V_{ee}) - 2 * V_{be}) * R7}{(R4 + R7) * R5},$$

where $V_{be}$ represents the combined base-emitter voltages of transistors Q2 and Q3. With circuit components having the following values: $V_{cc}$=5V, $V_{ee}$=−5V, $V_{be}$=0.66V, R7=1000Ω, R4=4700Ω, R5=150Ω, a constant current, I, equal to 10 mA, is provided.

As shown in FIG. 4, transistor Q5 is used to turn off the current source 60. A logic "1" level (e.g., 2V or greater) from the digital control device or µP 50 will turn on diode D3, which will turn on transistor Q5. Transistor Q5 being on will turn off transistor Q2, which will cause transistors Q4 and Q3 to turn off. With all the transistors off, the current source device 60 is placed in a high impedance state, thus, allowing the audio signals on TX− to pass through unimpeded on line 62 to the Gain/Control device 80. A logic "0" (e.g., less than 1 volt) from the digital control device or µP 50 will not turn on D3, which will keep Q5 biased off. Thus, the current source device 60 will operate in the ON state.

The current source device 60 is limited in the range of loads (e.g., microphone devices) to which it can provide current because of the operating supply voltages. As the load resistance is increased, the voltage present on the TX− audio signal transmitter terminal decreases. Once the voltage on TX− reaches a point where transistor Q4 saturates, the current through the load stops being constant and becomes dependent on the load resistance instead. In the example implementation shown in FIG. 4, that point occurs in loads of greater than 500 ohms. As carbon microphone resistance ranges from 40Ω to 200Ω ohms, the current source will operate correctly for a carbon-based transducer microphone. As the resistance of the electret-based transducer microphone is greater than 10 kΩ, the current source will operate in saturation.

Zener diode D2, is used for static discharge protection of the Current source device 60 and Gain/Freq/Control device 60.

Figure 3:
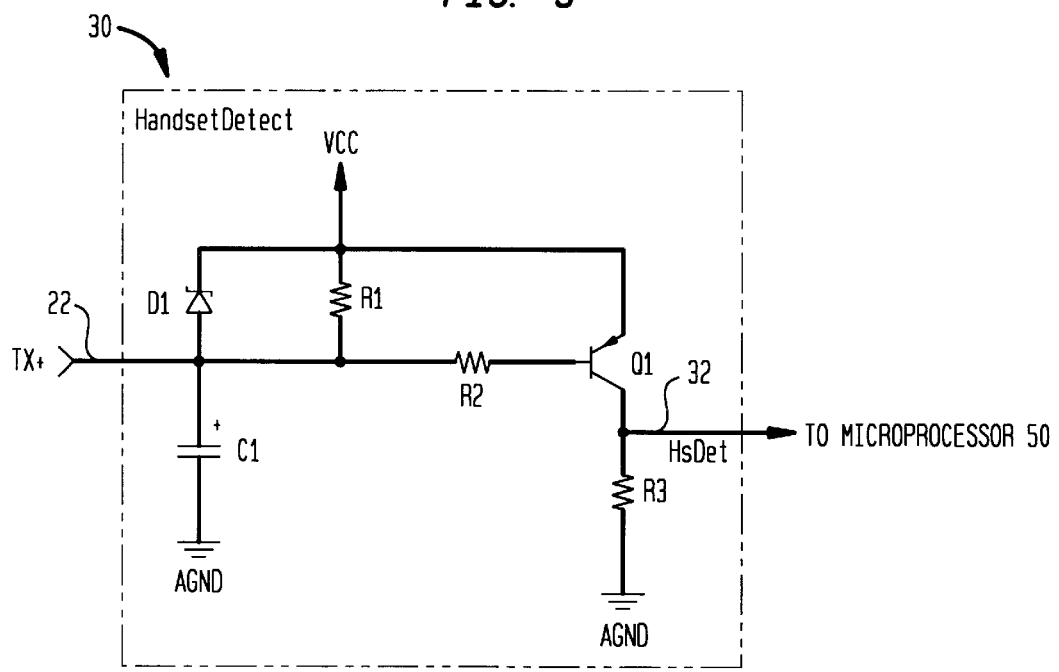
FIG. 3 is a detailed circuit diagram of the handset detect circuit of the telephone interface device of the invention.

FIG. 3 illustrates a non-limiting, example circuit diagram of one implementation of the handset detect device 30 for determining which type of handset is being used on the phone. Resistor R1 is used to sense the amount of current flow through the handset 20. If the current source is ON, it will attempt to sink current from the load between transmitter terminals TX+ and TX−. For carbon-based transducer microphones, the current source will operate correctly and source a constant current from Vcc through R1. In the example implementation shown in FIG. 3, and with a constant current source of 10 mA provided from constant current source device 60, a voltage of 2.2 volts is dropped across resistor R1 which is enough current to turn on transistor Q1 and signal the digital control device or µP 50 with a logic "1" signal on line 32 that the handset in use is a carbon-based transducer handset 20.

When the attached telephone handset is an electret-based handset, the current source provided from current source device 60 will not be able to source the current due and the current flow will be determined by the load the electret-based microphone presents to the current source device 60. As electret-based handsets may provide a resistance, $R_{electret}$ greater than 10 kΩ, the current that flows is approximately:

$$I = \frac{V_{cc} - V_{ee}}{R_{electret} + R1 + R5}$$

In the example embodiment shown in FIG. 3 with resistor R1 having a value R1=220Ω, less than 1 mA of current will flow through R1 and the voltage drop across R1 will be less than 0.22 V, which will turn off transistor Q1 and maintain it in the off state. This results in a logic "0" being sent the digital control device or µP 50 on line 32 to indicate that an electret-based handset 20 is being used.

As shown in FIG. 3, Zener diode D1 is used to protect the Handset detect device 30 from static discharge and capacitor C1 is used with R1 to form an RC filter to provide a clean DC bias for the electret handset.

Figure 5:
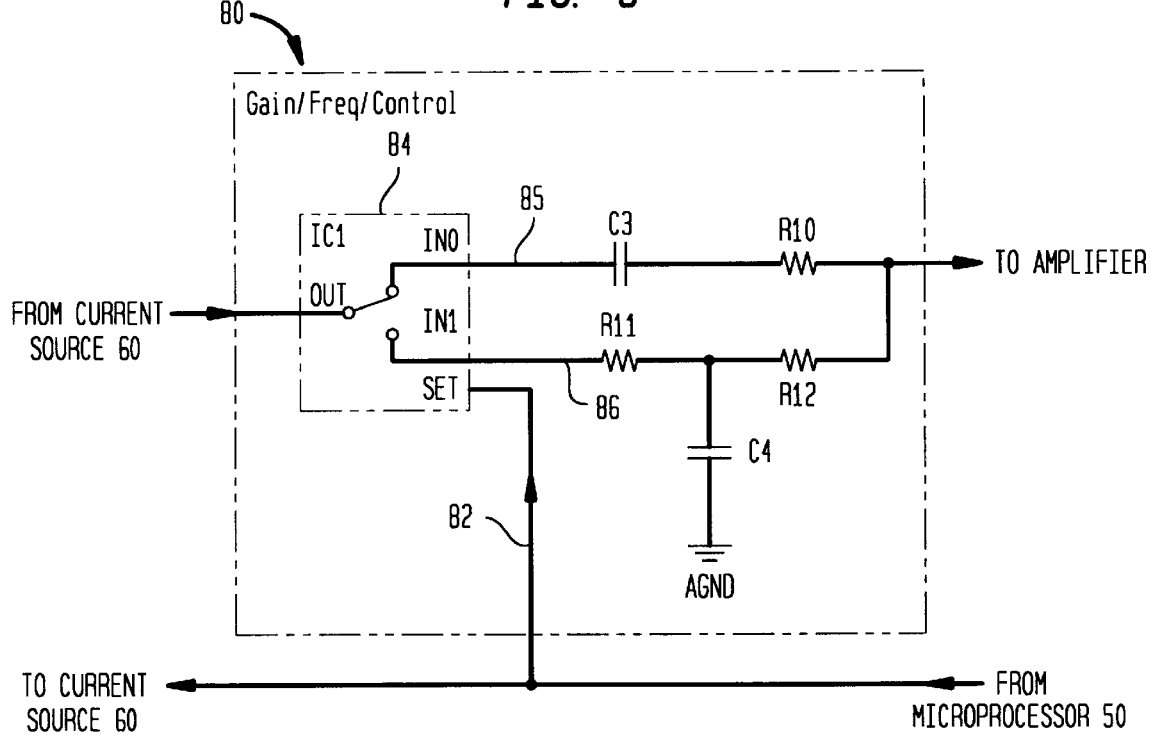
FIG. 5 is a detailed circuit diagram of the gain/freq/ control circuit of the telephone interface device of the invention.

FIG. 5 illustrates a non-limiting, example circuit diagram of one implementation of the Gain/Freq/Control device 80 for determining the amount of amplification and frequency characteristic alteration that will be given to the audio signal to be transmitted. The Gain/Freq/Control device 80 includes an analog switch 84 having a set input 82 and two networks of components to set the gain and frequency response differently for each handset type. If the digital control device or μP 50 sends out a logic "0" indicating a carbon-based transducer handset 20 is in use, then the analog switch 84 connects the audio signal line 62 with input line 85 having the network comprising capacitor C3 and resistor R10. The network of capacitor C3 and resistor R10 sets the gain to unity (1) for a carbon-based transducer handset with capacitor C3 is used as a DC blocking capacitor.

If the digital control device or μP 50 sends out a logic "1" indicating an electret-based transducer handset 20 is in use, then the analog switch 84 connects the audio signal line 62 with input line 86 having the network comprising capacitor C4 and resistors R11 and R12. In the example embodiment shown in FIG. 5 with resistors R11 and R12 having values of 1.0 kΩ and capacitor C4 having a value of 0.1 μF, the gain of the amplifier is set to 14 dB at low frequencies and the frequency response is rolled off starting at 1600 Hz. As shown in FIG. 5, no DC blocking capacitor is used so that the current flow from TX– will flow into the amplifier stage.

Figure 6:
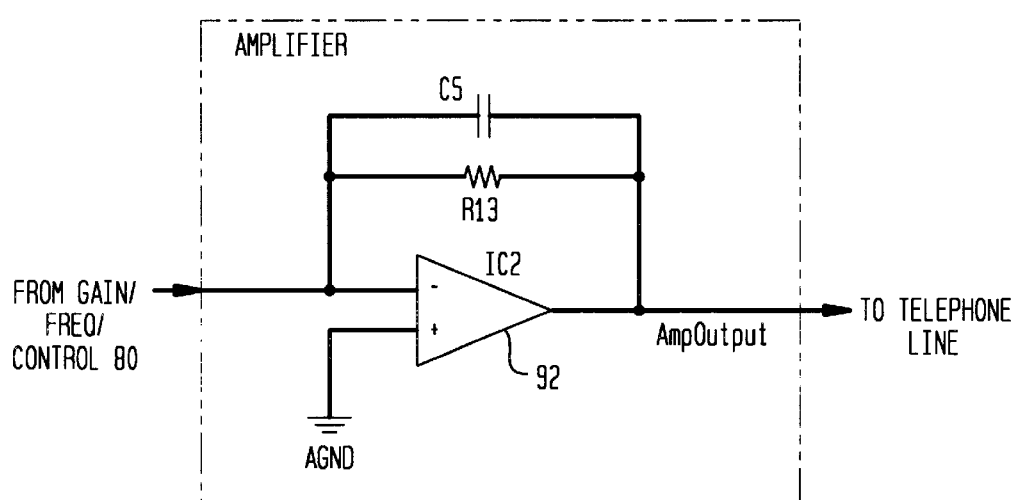
FIG. 6 is a detailed circuit diagram of the amplifier circuit of the telephone interface device of the invention.

As described above, the amplifier device 90 is used to provide gain for the electret-based transducer handset 20. In the non-limiting example embodiment shown in FIG. 6, the amplifier device 90 consists of an operational amplifier element 92 and the feedback components capacitor C5 and resistor R15. The feedback components, C5 and R13, form a low pass filter to bandlimit the signals to the audio frequency range with higher frequency rolloff starting at 10 kHz. The output of the amplifier device is sent through the normal telephone circuitry to reach a telephone line (not shown).

It should be understood that the preferred embodiments and examples described are for illustrative purposes only and are not to be construed as limiting the scope of the present invention which is properly delineated only in the appended claims.

I claim:

1. An interface circuit for a communications device capable of utilizing a variety of handset devices, each handset device having a different microphone transducer therein for converting audible sound into audio signals for transmission over a communications line, said interface circuit comprising:

current source means for providing current flow through said microphone transducer;

detecting means for detecting said current flow through said microphone transducer present in the handset device and generating a handset type signal according to the amount of current flow detected; and, adjusting means for adjusting the electrical characteristics of the audio signals transmitted according to said generated handset type signal.

2. The interface circuit for a communications device as claimed in claim 1, further including control means responsive to said handset type signal for maintaining said current source means in an ON state to provide a predetermined amount of current flow to said microphone transducer, or an OFF state substantially reducing current flow to said microphone transducer.

3. The interface circuit for a communications device as claimed in claim 2, wherein said said microphone transducer is a carbon-based transducer, said current source means being maintained in said ON state when a carbon-based microphone transducer is detected.

4. The interface circuit for a communications device as claimed in claim 2, wherein said microphone transducer is an electret-based transducer, said current source means being in said OFF state when an electret-based microphone transducer is detected.

5. The interface circuit for a communications device as claimed in claim 3, wherein said adjusting means includes an amplifier device for providing gain to said audio signals to be transmitted.

6. The interface circuit for a communications device as claimed in claim 5, wherein said adjusting means sets said amplifier gain to unity when said carbon-based microphone transducer is detected.

7. The interface circuit for a communications device as claimed in claim 5, wherein said adjusting means sets amplifier gain to greater than unity when said electret-based microphone transducer is detected.

8. The interface circuit for a communications device as claimed in claim 5, wherein said adjusting means includes means for frequency bandlimiting audio signals to be transmitted when said electret-based microphone transducer is detected.

9. An interface circuit for a communications device capable of utilizing a variety of handset devices, each handset device having a different microphone transducer utilized therein for converting audible sound into audio signals for transmission over a communications line, said interface circuit comprising:

current source means for providing current flow through the microphone transducer;

detecting means for detecting said current flow through said microphone transducer present in the handset device and generating a handset type signal according to the amount of current flow detected; and, control means responsive to said handset type signal for maintaining said current source means in an ON state to provide a predetermined amount of current flow to said microphone transducer, or an OFF state substantially reducing current flow to said microphone transducer.

10. The interface circuit for a communications device as claimed in claim 9, wherein said control means generates a control signal to according to said handset type signal received, said circuit further including adjusting means responsive to said control for adjusting the electrical characteristics of the audio signals transmitted.

11. The interface circuit for a communications device as claimed in claim 10, wherein said microphone transducer is an electret-based transducer, said current source means being in said OFF state when an electret-based microphone transducer is detected.

12. The interface circuit for a communications device as claimed in claim 11, wherein said adjusting means includes an amplifier device for providing gain to said audio signals to be transmitted.

13. The interface circuit for a communications device as claimed in claim 12, wherein said adjusting means sets said amplifier gain to unity when said carbon-based microphone transducer is detected.

14. The interface circuit for a communications device as claimed in claim 12, wherein said adjusting means sets amplifier gain to greater than unity when said electret-based microphone transducer is detected.

15. The interface circuit for a communications device as claimed in claim 12, wherein said adjusting means includes means for frequency bandlimiting audio signals to be transmitted when said electret-based microphone transducer is detected.

16. The interface circuit for a communications device as claimed in claim 12, wherein said adjusting means includes switching means for enabling said amplifier gain to be set to unity when said carbon-based microphone transducer is detected, and enabling said amplifier gain to be set to greater than unity when said electret-based microphone transducer is detected.

17. An interface device for mating transducer-based telephone handsets having different electrical input/output requirements to a telephone, said interface device comprising: a detecting device for detecting the type of transducer present in the telephone handset, and a means for modifying the electrical characteristics of audio signals output from said transducer to accommodate the telephone handset to be mated.

18. An interface device for mating transducer-based telephone handsets having different electrical input/output requirements to a telephone, said interface device comprising: a current source means for providing current flow through a transducer of said telephone handset;

detecting means for detecting said current flow through said transducer present in the handset device and generating a handset type signal according to the amount of current flow detected; and, adjusting means for adjusting the electrical characteristics of audio signals to be transmitted according to said generated handset type signal.

19. The interface device as claimed in claim 18, further including control means responsive to said handset type signal for maintaining said current source means in an ON state to provide a predetermined amount of current flow to said transducer, or an OFF state substantially reducing current flow to said transducer.

20. The interface device as claimed in claim 19, wherein said transducer is a carbon-based transducer, said current source means being maintained in said ON state when a carbon-based transducer is detected.

21. The interface device as claimed in claim 19, wherein said transducer is an electret-based transducer, said current source means being in said OFF state when an electret-based transducer is detected.

22. The interface device as claimed in claim 18, wherein said adjusting means includes an amplifier device for providing gain to said audio signals to be transmitted.

23. The interface device as claimed in claim 22, wherein said adjusting means sets said amplifier gain to unity when said carbon-based microphone transducer is detected.

24. The interface device as claimed in claim 22, wherein said adjusting means sets amplifier gain to greater than unity when said electret-based microphone transducer is detected.

25. The interface device as claimed in claim 22, wherein said adjusting means includes means for frequency band-limiting audio signals to be transmitted when said electret-based microphone transducer is detected.

26. An interface device for mating transducer-based telephone handsets having different electrical input/output requirements to a telephone, said interface device comprising: a current source means for providing current flow through the microphone transducer;

detecting means for detecting said current flow through said microphone transducer present in the handset device and generating a handset type signal according to the amount of current flow detected; and, control means responsive to said handset type signal for maintaining said current source means in an ON state to provide a predetermined amount of current flow to said microphone transducer, or an OFF state substantially reducing current flow to said microphone transducer.

27. The interface device as claimed in claim 26, wherein said control means generates a control signal to according to said handset type signal received, said device further including adjusting means responsive to said control signal for adjusting the electrical characteristics of audio signals to be transmitted by said telephone.

28. The interface device as claimed in claim 26, wherein said transducer is an electret-based transducer, said current source means being in said OFF state when an electret-based transducer is detected.

29. The interface device as claimed in claim 28, wherein said adjusting means includes an amplifier device for providing gain to said audio signals to be transmitted.

30. The interface device as claimed in claim 29, wherein said adjusting means sets said amplifier gain to unity when said carbon-based transducer is detected.

31. The interface device as claimed in claim 29, wherein said adjusting means sets amplifier gain to greater than unity when said electret-based transducer is detected.

32. The interface device as claimed in claim 29, wherein said adjusting means includes switching means for enabling said amplifier gain to be set to unity when said carbon-based microphone transducer is detected, and enabling said amplifier gain to be set to greater than unity when said electret-based microphone transducer is detected.

33. The interface device as claimed in claim 28, wherein said adjusting means includes means for frequency band-limiting audio signals to be transmitted when said electret-based microphone transducer is detected.

* * * * *